Oct. 19, 1965  A. P. PEDRICK  3,212,262
COMBINATION PISTON-TURBINE INTERNAL COMBUSTION ENGINE
Filed March 25, 1963  10 Sheets-Sheet 1

Oct. 19, 1965  A. P. PEDRICK  3,212,262
COMBINATION PISTON-TURBINE INTERNAL COMBUSTION ENGINE
Filed March 25, 1963  10 Sheets-Sheet 3

Oct. 19, 1965     A. P. PEDRICK     3,212,262
COMBINATION PISTON-TURBINE INTERNAL COMBUSTION ENGINE
Filed March 25, 1963     10 Sheets-Sheet 6

Oct. 19, 1965  A. P. PEDRICK  3,212,262
COMBINATION PISTON-TURBINE INTERNAL COMBUSTION ENGINE
Filed March 25, 1963  10 Sheets-Sheet 9

United States Patent Office 3,212,262
Patented Oct. 19, 1965

3,212,262
COMBINATION PISTON-TURBINE INTERNAL COMBUSTION ENGINE
Arthur Paul Pedrick, 77 Hillfield Road, Selsey, near Chichester, England
Filed Mar. 25, 1963, Ser. No. 267,753
15 Claims. (Cl. 60—39.38)

This invention relates to a novel engine or "prime mover" intended for the conversion of the energy in a fuel into mechanical power. The engine, according to the invention, has particular application to the propulsion of automobiles or vehicles of an automotive character.

The present invention has, as its primary object, a novel form of prime mover or engine for the conversion of the energy in a fuel into mechanical power which will combine, in a compact self-contained power unit suitable for installation in an automobile of average size, the high compression ratio and the proportionate variation of mass flow with piston speed obtainable in engines of the piston type with the high torque at zero speed characteristic of a gas turbine engine. From such combination it is proposed to obtain a power unit which will have advantageous operating characteristics which cannot be obtained in either the piston-connecting rod or the rotary compressor-gas turbine power units in their present known forms.

The novel engine of the present invention embodies an output impeller, cooperating rotor and stator assemblies, one of the assemblies including one or more chambers in which a combustible fuel is compressed by the operation of a piston and ignited, and the other including means for closing the chamber to permit compression of the combustible fuel, for exhausting the gases of combustion, for utilizing them to impart rotation to the rotor assembly and for directing them as an impelling fluid against the output impeller.

Other aspects of the invention include the means for supplying the combustible fuel to the piston chamber or chambers, the means for by-passing the exhaust gases of combustion when they are not required to drive the output impeller, the means for imparting relative movement between the piston and the chamber to compress the combustible fuel, and the means for cooling the engine.

The engine or prime mover according to the present invention will be made clear with reference to the accompanying drawings showing a preferred embodiment and wherein:

FIGURE 15 shows on a much enlarged scale, as compared to the other figures, part of the engine in cross-section on a plane including the axis of the engine and also the axis of one of the pistons 17;

FIGURES 15A and B, respectively, show cross-sectional views in planes transverse to the axis of a piston 17 as seen from the lines of the arrows A—A and B—B in FIGURE 15;

FIGURES 19A and B are side and front views, respectively, of an automobile having parts cut away to show one manner of possible installation of an engine according to the invention;

FIGURES 20A and B are views similar to FIGURES 19A and B of another manner of installation of the engine in an automobile;

FIGURES 25A and B show an alternative form of the engine in cross-sectional views in planes transverse to and on, respectively, the axis $x$—$x$ of the engine wherein the pistons compress the gases on a radial outward stroke instead of the inward stroke;

FIGURES 26A and B show views corresponding to those of FIGURES 25A and B of still another form of the engine in which the pistons are arranged with their axes parallel to one another and to the main axis $x$—$x$ of the engine.

Figure 3:
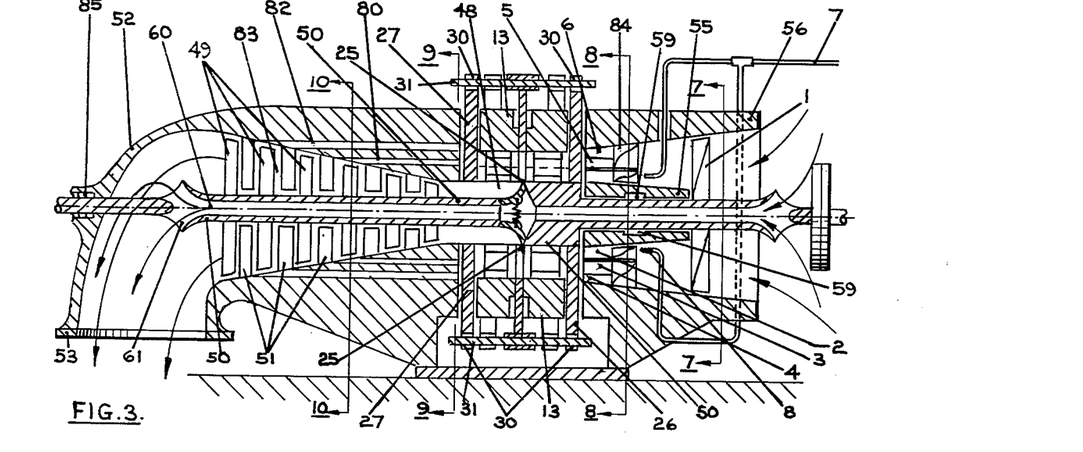
FIGURE 3 is a cross-sectional view on a vertical plane taken along the line 3—3 of FIGURE 2 looking in the direction of the arrows.

Referring to FIGURE 3, air from the atmosphere is impelled by a rotary axial flow fan 1 into three coaxial channels 2, 3 and 4, the intermediate channel 3 being separated from the inner and outer channels 2 and 4 by coaxial partition walls 5 and 6. The inner of such channels 2 forms the main air inlet to the engine, and liquid or gaseous fuel is sprayed into the air passing through the channel 2 from the fuel lines designated 7 having spray nozzles 8 at the end thereof. The fuel supplied through the pipes 7 is metered by suitable means and supplied by a pump or directly from a reservoir.

Figure 12:
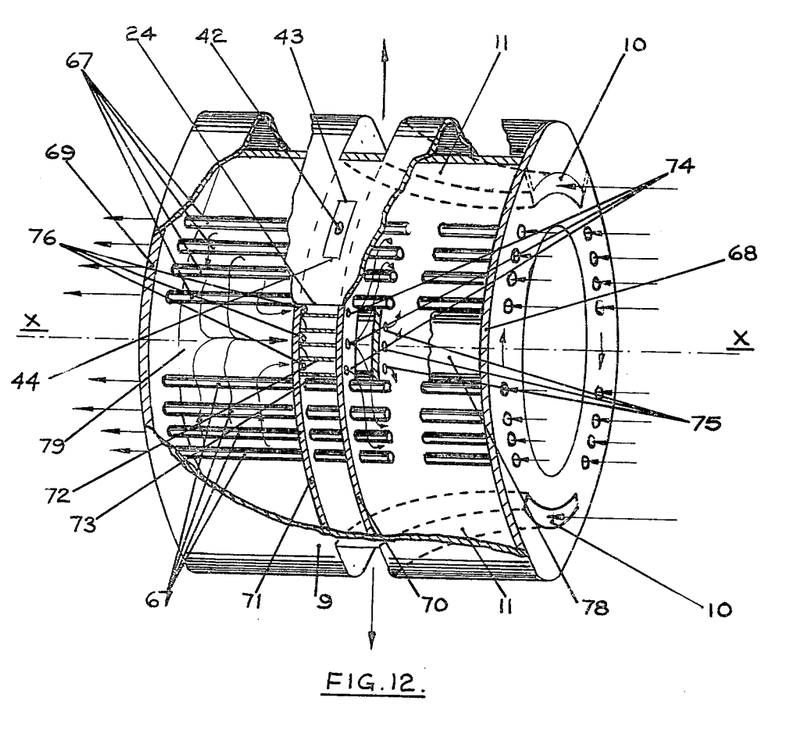
FIGURE 12 shows a perspective view of the part of the engine.

The fuel and air, mixed according to the particular conditions under which the engine has to operate, passes further down the channel 2 and enters the body of a rotatable assembly 9, hereinafter referred to as the first or upstream rotor. More specifically, as best shown in FIGURE 12, the upstream end of the rotor carries two ducts 10 of generally rectangular cross-section which have inlet ports on opposite sides of the axis of rotation of the rotor, and these ports communicate with the fluid in the passage 2 on the downstream side of the fan 1. The passages 11 through the ducts terminate in outwardly extending discharge ports 12. The air-fuel mixture thus enters the ducts 10 of the first rotor 9 in an axial direction from the discharge side of the fan 1, and the passages 11 through the ducts deflect the gases to the radial discharge ports 12.

Figure 4:
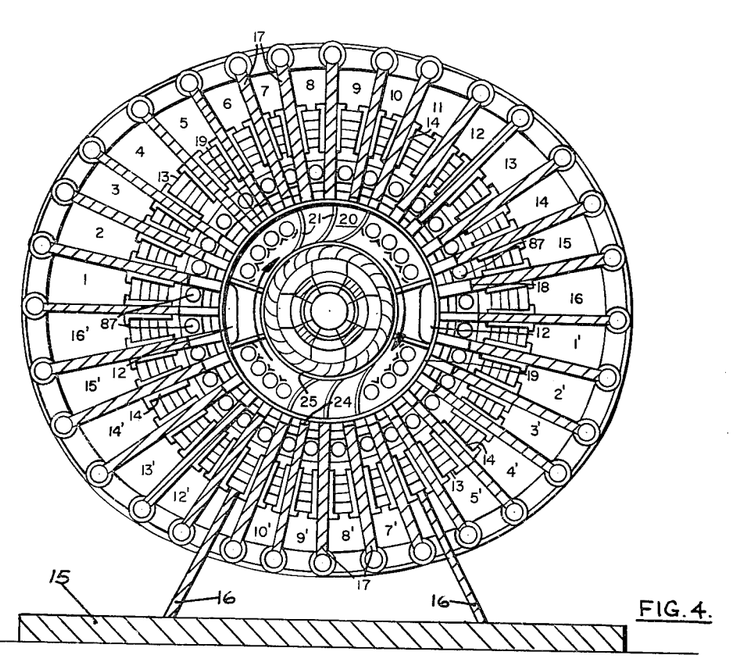
FIGURE 4 is a cross-sectional view on an enlarged scale of the engine on a vertical plane transverse to the main axis of the engine taken along the line 4—4 looking in the direction of the arrows.

Referring now to FIGURE 4 of the drawings, it will be seen that the engine further comprises a stator assembly 13 (sometimes hereinafter called the "cylinder block" or the "block") within which are machined a plurality of equispaced radial bores 14. This stator assembly 13 is stationary at all times and supported from the base plate 15 of the engine by legs 15a welded or otherwise fixedly joined to both the base plate 15 and a part of the outer cylindrical surface of the stator assembly 13. The stator assembly has a cylindrical main bore, the axis of which forms the main axis $x$—$x$ of the engine, within which the rotor assembly 9 rotates.

The outer ends of the radial bores 14 of the stator assembly are approximately twice the diameter of the inner ends thereof. Each bore accommodates therein a piston 17 of uniform cross-section which is in close fitting relationship with the inner end of the respective bore. The pistons 17 are reciprocated in sequence in their respective bores 14 in a manner which will be made clear below, but for present purposes it should be noted that the ports 12 in the outer cylindrical surface of the rotor 9 are opposite and communicate with the inner ends of the bores 14 in the block 13 and the inner ends 18 of the pistons 17. There is thus left between the piston ends 18 and the outer surface of rotor 9 at each of the ports 12 a space into which may flow the air-fuel mixture forced through the passages 11 of the ducts 10 by the fan 1.

Assuming that the first rotor 9 is rotating clockwise, as viewed in FIGURE 4, it will be understood that a mass of the air-fuel mixture is introduced into the inner end of bores 14 in sequence during the outward or suction strokes of the respective pistons. As soon as the lip 19 of the port 12 has passed beyond the end of the bore 14 being considered, the charge introduced into the inner end of the respective piston bore 14 becomes enclosed within such space by the outer cylindrical surface of the first rotor 9. The piston 17 is then moved radially inwards, in a manner which will be explained later, compressing the charge of air-fuel mixture. The air-fuel mixture is then ignited so that the heat released by the burning of the mixture will further increase the pressure in the space just as in the conventional in the same manner as the piston, connecting rod type of engine. During the continued rotation of the first rotor 9, successive charges of air-fuel mixture, after entering the inner ends of the bores 17, are compressed therein, and after successive ignition, charges of mixture are raised to a high pressure.

Equispaced circumferentially in the rotor 9 between the discharge ports 12 of the ducts 10 are a pair of diametrically opposite openings 20 which communicate with the spaces between a series of guide vanes or turbine blades 21. These blades have their outer ends 22 directed substantially radially with respect to the main axis of the engine $x$—$x$, but are arcuate so as to have their inner ends 23, directed at an angle inclined to imaginary radial lines extending from the axis $x$—$x$ of the engine to the innermost ends of the blades.

Thus, as the rotor 9 rotates and the lip 24 (see FIGURE 12) defining the leading end of an opening 20 uncovers the inner ends of a bore 14 containing a mass of air-fuel mixture now ignited and burning under high pressure, such mass of burning mixture and the products of combustion thereof begin to escape into the opening 20 in the rotor 9. With still further rotation of rotor 9, the entire inner end of a bore 14 becomes uncovered, and the burning mixture, at high pressure and temperature, discharges into the opening 20. Since the circumferential length of each opening 20 places at least three of the piston bores 14 in communication with the opening at any given position of the rotor 9 and is so timed with the pistons and the ignition of the air-fuel mixture within the bores 14, the opening 20 will be supplied at all times with burning air-fuel mixture at high temperature and pressure. The burnt or burning air-fuel mixture, at high pressure, thus enters the openings 20 in the rotor 9, and in its expansion radially inwards has its flow guided by the arcuate vanes or blades 21, so that on leaving the inner ends 25 of the passages between the blades the gases of combustion have had their direction changed circumferentially. The direction with which they leave the passages between the blades 21 will, it is clear, depend upon the curvatures of the blades 21.

It will be clear that, due to such change in direction circumferentially in passing over the surfaces of the blades 21, the gases of combustion will exert a reaction from the gas pressure which will act to sustain the rotation of the rotor 9 in the direction indicated by the arrow shown in FIGURE 4. The timing of the parts is such that as the rotor 9 rotates within the inner cylindrical surface of the stator block 13, the ports 12 in the rotor are in communication with the inner ends of bores 14 in which the pistons are moving radially outwards on a suction stroke to supply the air-fuel mixture to the bores, and the openings 20 are in communication with the inner ends of different bores in which the pistons are moving inwardly and in which the gases have been highly compressed and ignited. Thus, the rotor 9 will have applied to it a continuous torque derived from the change of circumferential velocity of the gases in flowing over the surface of the blades 21 which tends to sustain the rotation of the rotor.

There are secured to the end faces of the rotor 9 (FIGURES 3, 5 and 6) a pair of plates or thick discs 26 and 27, such plates being, therefore, rotatable at all times with the rotor 9, and at the same speed thereof, and having their inner side surfaces adjacent but having a small clearance with respect to the radial end faces of the block 13, so that they can rotate with the rotor 9. Disposed between the inner side surfaces of the plates 26 and 27 and the end faces of the block 13, suitable ball or roller bearings 28 (see FIGURE 15), are interposed so as to locate the plates 26 and 27 for low friction rotation with respect to the block 13, and such bearings 28 also serve to position the rotor 9 for rotation within the inner cylindrical recess of the block 13.

Figure 5:
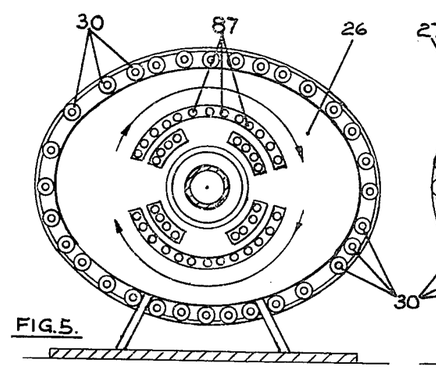
FIGURE 5 is a view looking from right to left, as in FIGURE 3, from the line of the arrows 5—5 so as to look directly on the outside face of one of the cam plates.
Figure 6:
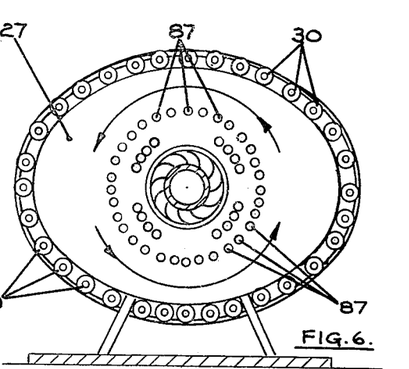
FIGURE 6 is a view similar to that of FIGURE 5, but looking from the left in FIGURE 3, as from the line of the arrows 6—6 looking directly on the outer axial face of the other cam plate.

The plates 26 and 27 have an outer periphery 29 which acts as a cam profile and, therefore, the plates 26 and 27 may be more fully designated cam plates, but for brevity will hereafter be referred to as "the plates." As best seen in FIGURES 5 and 6, a plurality of rollers 30 engage the outer periphery of the plates 26 and 27. These rollers 30 have small flanges to maintain their lateral position with respect to the periphery of the plates 26 and 27. Although not shown in the drawings, the rollers 30 would preferably each be provided with ball or roller bearings by which they are capable of low friction rotation on each end of a series of shafts 31 which extend across the outer cylindrical surface of the block 13, so that the shafts 31 have axes which are substantially parallel with the main axis of the engine $x$—$x$. Each of the shafts 31 carries a sleeve 32 thereon which is formed integrally with or fixedly secured to the outer end of the corresponding piston 17. The shafts 31 therefore, do not rotate but the ends thereof form low friction journals for the rotation of the rollers 30. It will thus be understood that the change in effective radius about the axis x—x of any part of the periphery 29 of the cam plates 26 and 27 will cause a radial movement of the respective piston 17 in its bore 14.

Figure 7:
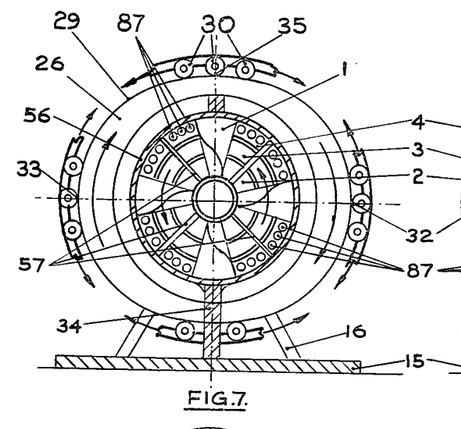
FIGURES 7, 8, 9 and 10, respectively, are transverse cross-sectional views taken on the lines 7—7, 8—8, 9—9 and 10—10, respectively, of FIGURE 3 looking in the direction of the arrows.
Figure 8:
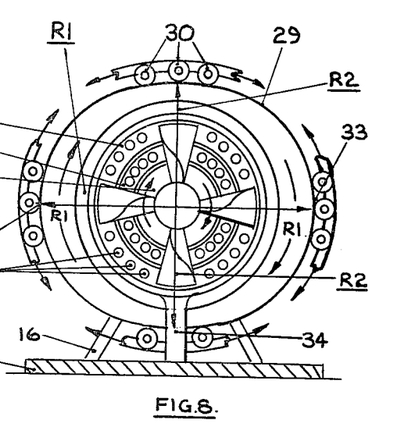
Figure 9:
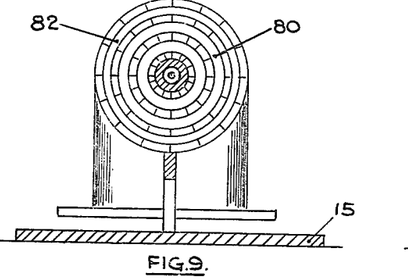
Figure 10:
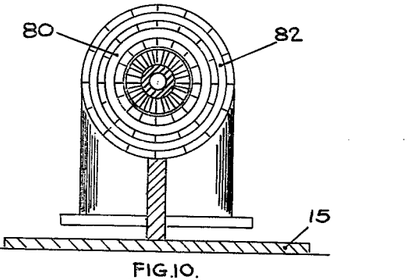

The cam profiles of the plates 26 and 27 are exactly similar and, as best shown in FIGURES 7 and 8, the cam profiles of both plates have a maximum effective radius R1 at diametrically opposite points 32 and 33 and a minimum effective radius R2 at diametrically opposite points 34 and 35. The points 32, 33, 34 and 35, as shown, are spaced at 90 degrees around the axis of the engine x—x, but such spacing need not necessarily be exactly equal.

When a pair or rollers 30 carried by one of the shafts 31 is in engagement with a part of the cam periphery 29 of cam plates 26 and 27 in the proximity of the points 32 and 33, it will be clear that the shaft will have been moved near to its maximum possible movement away from the main axis of the engine x—x and that, therefore, the corresponding piston 17 will have been moved the maximum possible distance outwardly in its bore 14. The piston is then at the end of its suction stroke.

It will be clear, therefore, that since the rotor 9 rotates at exactly the same speed as the cam plates 26 and 27, if the ports 12 through which air-fuel mixture is supplied to the bores 14 face in the same directions as the high portions of the cam plates, as the rotor rotates the pistons will always be disposed within their respective bores in positions to receive the air-fuel mixture, and the air-fuel mixture will be continuously discharged through the ports to the pistons so disposed one after the other.

As the low portions of the cam plates 26 and 27 come into engagement with the end rollers 30 of successive shafts 31, the pistons are displaced inwardly in their respective bores by spring means. Two forms of spring means are shown in the drawings. The first of such spring means are compression springs 36 (see FIGURE 15) disposed within the enlarged outer ends of each of the bores 14 in the block 13. The inner ends of the springs 36 act against collars 37 carried on each of the pistons 17, and the spring force is transmitted to the respective pistons through pins 38. The compression exerted by each spring can be adjusted by adjustable spring retaining bushings 39 threaded on sleeves 16a affixed to the stator 13 at the outer end of each of the bores 14. Preferably, as shown, two such springs 36 act on each piston.

The second form of spring means comprises a plurality of bands or straps 40 which extend circumferentially around the engine and engage rotatable sleeves 41 journalled on the shafts 31 and disposed intermediate the rollers 30 and the bosses 32. Such circumferentially extending spring bands or straps are made of resilient material, such as rubber suitable reinforced to limit its extensibility. Although, as shown, the bands 40 are of rectangular cross-section and two such bands are provided, the number and cross-section of such bands vary, for example, the bands may in the form of close coiled steel bands. Also means may be provided whereby the tension of such springs 40 may be adjusted by altering their effective length, as will be described in connection with the embodiment of the engine shown in FIGURES 21 through 24 of the drawings.

It will thus be clear that both the compression springs 36 and the tension bands 40 act, at all times, to produce an inward force on the pistons 17. Whereas the springs 36 act individually on their respective pistons 17 and their compression may be adjusted individually by the screwed bushings 39, the spring bands 40 act collectively on all the pistons and the forces exerted thereby are not separately adjustable. It is, of course, possible to eliminate one of the types of spring means or to substitute other means to displace the pistons inwardly within their bores.

By the action of the springs, the pistons 17 are moved successively inwards radially on strokes upon engagement of the rollers 30 with the low portions of the cam plates 26 and 27, compressing the air-fuel mixture within the inner ends of the bores 14. It will be clear, therefore, that if the exhaust openings 20 in the rotor 9 face the low portions of the cam plates the pistons 17 will reach their radially innermost positions, corresponding to the maximum compression of the air-fuel mixture, at the same time that the inner ends of the bores begin to be uncovered by the lips defining one edge of each of the exhaust openings 20. Thus, the exhaust openings 20 are constantly being supplied with the products of combustion at high pressure, and the gases are directed against the blades 21, thereby exerting a driving torque which imparts rotation to the first rotor 9.

The compression ratio under which the ignition and burning of the air-fuel mixture will take place depends upon the compression applied by the spring 36 and/or the tension applied by the spring bands 40. Both such types of springs are readily accessible externally of the engine and, therefore, in contrast to the fixed compression ratio associated with the design of the ordinary piston, connecting rod or gas turbine engines, in the engine herein proposed it is an easy matter to adjust quickly the compression ratio to suit the type of fuel to be used by the engine.

It will, therefore, be understood that the rotor 9, the cam plates 26, 27, the rollers 30, the shafts 31 and the pistons 17 constitute an arrangement for producing a continuous gas stream whereby the rotation of the rotor 9 may be sustained provided an air-fuel mixture is supplied thereto and means provided for igniting the fuel. It should be understood that such arrangement constitutes a means for producing a supply of burnt or burning air-fuel mixture at high pressure which is effluent from the inner radial part of the blading 21 on the rotor 9, and the rotor does not, nor is supposed to, generate a torque for performing useful work. (Such an arrangement, therefore, corresponds to a gas generator part of the Chrysler CR2A engine referred to in the introductory part of the specification with the important difference that the compression is carried out by a series of radially movable pistons instead of by a rotary compressor.)

Reference must here be made to the ignition of the air-fuel mixture that has flowed into the spaces below the inner radial ends of the pistons 17. If the compression exerted by springs 36 and/or 40 is sufficient to raise the temperature of such air-fuel mixture, ignition may thus be spontaneous or of diesel compression-ignition type and would take place at a certain position on the radial inward movement of each piston 17, such position corresponding to a certain condition in the rotation of the rotor 9 as determined by the profile 29 of cam plates 26 and 27.

If the ignition is not of the type characteristic of diesel engines, a hot filament ignited electrically through slip rings from a power source remote from the rotor 9 may be used, or the means of ignition may, once the engine has been started, take form of a glow plug 42 shown in FIGURE 12. Provided that the glow plug 42 will be sustained at red heat once the engine is running, it will be clear that ignition of the air-fuel mixture below the pistons will take place automatically as the rotor 9 turns. The position of such glow plug angularly in respect to the exhaust openings 20 must be determined in relation to the possible "delay" period for the fuel the engine is using to insure that the maximum rate of burning of the fuel becomes effective at, or near to, the angular condition of the rotor at which full compression of the air-fuel mixture has taken place. Toward this end, means can be provided, which may be operated electrically from speed responsive devices externally of the rotor 9 through slip rings or by some form of centrifugally operated device incorporated in the rotor 9, to advance or retard the angular position in the outer cylindrical face of the rotor 9 between limits, as those indicated by the numerals 43 and 44 in FIGURE 12, so as to arrange for the air-fuel mixture to burn fully at the optimum condition of movement of the pistons 17 in relation to the rotational speed of rotor 9. Such action is very similar to the advance or retard of the spark in the operation of the conventional piston, connecting rod type internal combustion engine and will be considered further in a later part of the description referring to the necessary speed of the rotor 9 and the swept volume of the bores 14 in relation to the output in horsepower required from the engine.

The cam plates 26 and 27 are of sufficient mass to act as flywheels in sustaining the rotation of the rotor 9. The exact mass of the plates 26, 27 must be determined in relation to the minimum speed at which steady rotation of the rotor 9 is required to provide, in combination with the mass of the rotor 9 itself, a sufficient inertia to sustain such rotation in respect of changes in the state of the fuel supply and the resistance to be overcome by the torque exerted on the rotor 9 by the effluent gases.

Considering the equilibrium of the rotor 9 under a state of rotation at steady speed, it should be realized that if the spaces in the bores below the pistons had therein at all times a complete vacuum, so that no work was done by the pistons 17 on their compression strokes, and assuming also that there was no frictional resistance to the rotation of rotor 9, such rotation would be unaffected by any variation in the compression of springs 36 or the tension in springs 40. This condition results from the fact that the springs 36 and 40 act through the rollers 30 which, in turn, engage that part of the profile 29 of the cam plates 26 and 27 where the effective radius is reducing, producing an accelerating torque on the plates 26 and 27 which counterbalances the retarding torque exerted by those rollers 30 engaging that part of the cam profiles 29 where the effective radius is increasing. When, however, there is a mass of air-fuel mixture below the piston ends, the compression of such mass reduces the accelerating torque imparted by the rollers 30 on the parts of the cam profiles with reducing effective radius, so that such torque does not exactly counteract the retarding torque of the other rollers. It is this out-of-balance torque, as well as the frictional resistance, that has to be exceeded by the torque applied to the rotor 9 in order to sustain a steady rotation of the rotor 9.

The foregoing description should make clear the operation of the first part of the engine, the function of which is simply to act as a gas stream producing device and not to provide any output of usable mechanical power.

Figure 2:
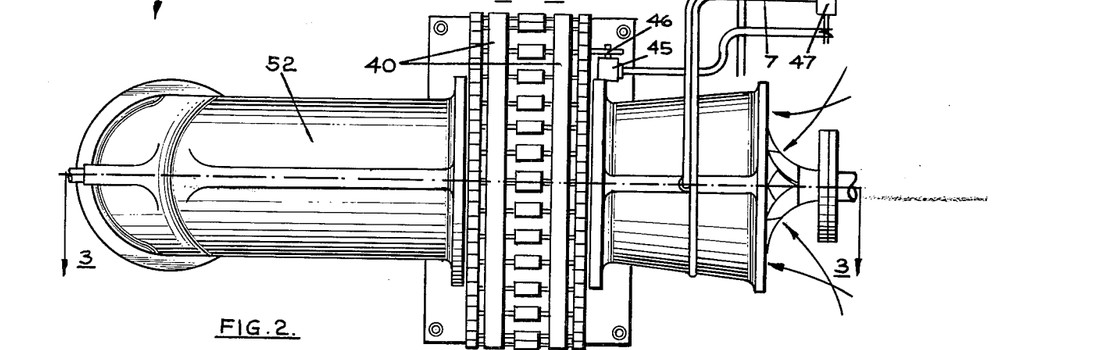
FIGURE 2 is a plan view of the engine shown in FIGURE 1.

Any means for governing the fuel supply to regulate the speed of rotor 9 may be provided, but the particular means shown in the drawings comprises a small generator 45 (FIGURE 2) which produces an electrical output in variance with the speed of rotation of a small wheel 46 on the generator shaft in frictional contact with the end face of the cam plate 26. The current from such generator is used to control a solenoid governing the fuel flow by a valve 47.

Returning to the general description of the operation of the engine, the burnt or burning air-fuel mixture and the products of combustion thereof in gaseous form, after passing through the stage of impeller blades 21, then passes through a series of stages of impeller blades 48, 49 carried by a second or output rotor 50. The first series of blades 48 are shaped to turn the gas flow both circumferentially and axially so that it flows out of the central part of the engine to the left, as viewed in FIGURES 3 and 11, before flowing through a plurality of stages of the blades 49.

The blades 48 extend around the periphery of the rotor 50 near the center of the rotor having their outer radial edges provided with angular surfaces so shaped that the gases will flow smoothly thereon from the blading 21 of the rotor 9 when both the rotor 9 and rotor 50 are rotating at/or near the speeds at which design considerations require that they shall operate most efficiently. The blades 48 extend axially so far as to just project to the left beyond the counterstream side of cam plate 27.

The stages of impeller blades 49 alternate with the stages of stator blades 51 secured to the expanding passage through the casing 52 downstream of rotor, stator assemblies 9, 13. The number of stages of the blades 49 and 51 will depend upon the final exhaust temperature required for the engine.

After passing through the full number of axial flow stages of impeller blades, the gases are deflected downwardly at the discharge ends of the casing 52 and are discharged into the atmosphere at a reduced velocity in a direction generally downwardly but having a vector component parallel to the axis of the engine.

Figure 1:
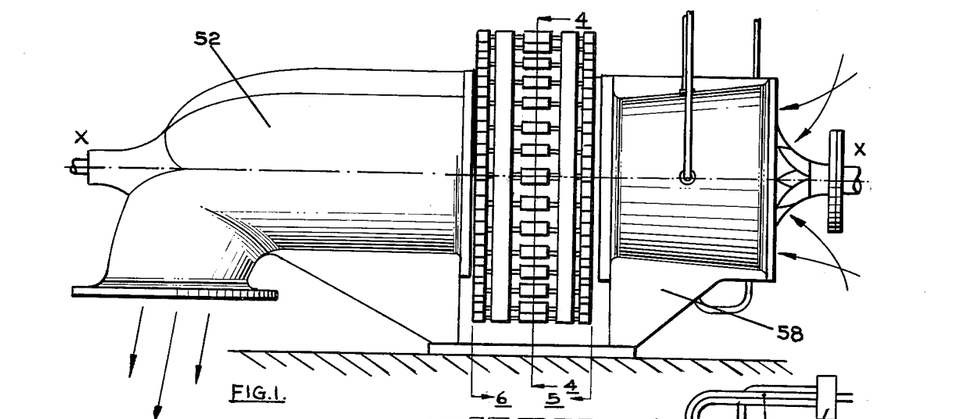
FIGURE 1 is a longitudinal elevational view of the engine of the present invention.

The upstream end 54 of the rotor 50 has a smaller diameter than the central part thereof and this upstream end passes through a central hole in the cam plate 26 and then through the bore in a generally cylindrical wall 55 which is formed as an integral casting with or secured to the part 56 of the casing by radially extending arms 57, as shown in FIGURE 7. This outer casing part 56 is welded or otherwise secured fixedly to the base plate 15 by a central rib member 58 (FIGURE 1), and at this end of the engine the shaft 54 of the rotor 50 is journalled for support and rotation by means of a ball or roller bearing 59 mounted within inner cylindrical wall 55.

It will be understood that since the first rotor 9 and the second or output rotor 50 are coupled only by gas flow for rotation in opposite directions to each other, and not by any mechanical means, it is possible for the first rotor 9 to be rotated while the rotor 50 is stationary, such as would be the normal condition of the engine in an automobile with the engine running and the automobile at a standstill. Under such conditions, however, it would be necessary for all the gases flowing out of the rotor 9 radially inwards to pass through the axial flow blading 49 and 51 before exhausting to the atmosphere if there were no other path by which such gases could escape. Under such conditions, the outflowing gases would exert a torque on the rotor 50, and in order to prevent this torque from moving the vehicle it would be necessary to apply a brake to the wheels at all times when the automobile is parked with its engine idling. To prevent this, the rotor 50 is provided with means whereby the gases may by-pass the axial flow blading 49 and 51 before being discharged to atmosphere, thus reducing the torque exerted by the gases on the rotor 50 when the engine is idling with only the rotor 9 rotating. This by-pass also makes possible a minimum gas flow for the imparting rotation of rotor 9.

Figure 16:
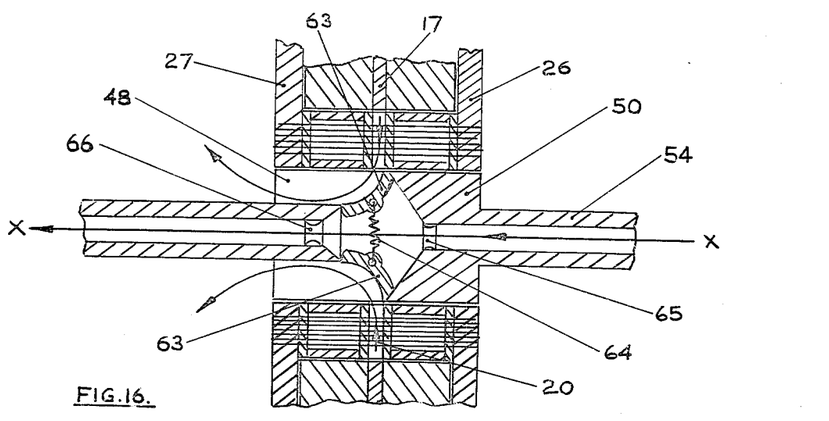
FIGURE 16 is a cross-sectional view of the central part of the engine on a vertical plane including the main axis $x$—$x$ with the rotor of the output turbine in a condition such that all the gases must pass through the axial flow turbine blading.
Figure 17:
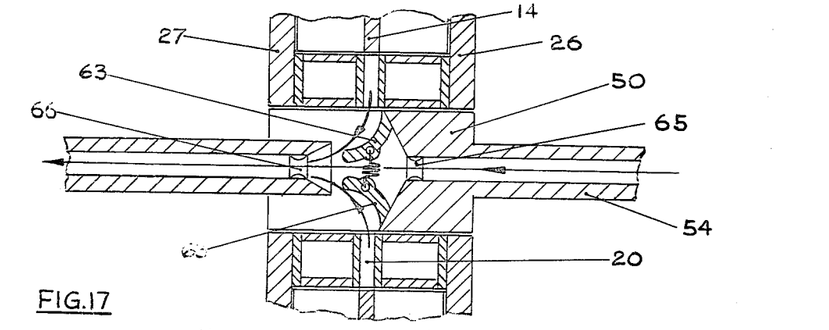
FIGURE 17 is a view similar to FIGURE 16, but with the rotor of the output turbine in a condition to by-pass the gases past the axial flow turbine blading.

The by-passing of the blades 49 and 51 is accomplished by a central passage 60 bored through the downstream end of the rotor 50 and terminating in discharge ports 61 downstream of the blades 49 and 51 which impart a twist to the gas to impel a certain amount of air flow from right to left, as seen in FIGURE 3, before being discharged through the exhaust pipe 53. The flow of the gases from the impeller blades 21 into the passage 60 is controlled by gates 63 which normally are maintained in the closed position shown in FIGURES 3 and 16, so that the outer surfaces thereof act to smoothly deflect the gases to the impeller blades 48 carried by the rotor 50. The gates 63, however, can be opened, as shown in FIGURE 17, so that the gases may enter the by-pass passage 60. The gates 63 are connected by a spring 64 which urges them to open positions. The force of the spring 64, however, is quite moderate so that at any time that the rotor 50 attains a rotational speed greater than some predetermined speed, say 100 r.p.m., the centrifugal force acting on the gates 63 overcomes the effect of the spring 64 and closes the gates.

If the condition is considered in which the rotor 50 is not rotating and the first rotor 9 is idling at its minimum possible speed, the gases will be mainly by-passed through the open gates 63 and the central passage 60, such being the condition for an automobile engine ready to move. If now the engine is accelerated by increasing the fuel supply to the air being drawn in through the channel 2, the speed of rotation of the rotor 9 will be increased and an increased volume of gases will be discharged into the exhaust opening 20. Because the gates 63 are open and the gases can by-pass the axial flow turbine blades 48, 49, instead of a high output torque being produced to initiate the rotation of rotor 50, only a relatively small increase of torque will result. In order to avoid this condition, there are provided in the passage 60, the central part including the gates 63, necks or constrictions 65 and 66, as shown in FIGURES 16 and 17. The constrictions 65 and 66 are upstream and downstream, respectively, of the gates 63 and these constrictions are such that if the rate of flow of gases through the open gates 63 is increased to an extent substantially greater than that provided by the rotor 9 at its minimum idling speed, the flow will build up in the passage 60 between the constrictions 65 and 66 a back-pressure that is sufficient to close the gates 63 against the force exerted by the light springs 64. Thus, if the engine is idling with the rotor 9 moving at near to its minimum speed and the gases are by-passing the non-rotating axial flow blades 49, as soon as the automobile accelerator is operated to increase the speed of and mass flow through the rotor 9, the gates 63 will be closed by outward radial movement caused by the back-pressure thereon, and thereafter all the gas flow passes through the blades 48, 49 and 51, and the engine begins to produce power output with its maximum low speed torque. There has been provided an arrangement whereby the gas flow is made to automatically by-pass the output turbine blading at all times when such blading is not rotating, provided the gas flow from the rotor 9 is below some minimum rate of flow.

The above description is all that is necessary to understand the basic principle on which the engine operates, i.e., the compression of an air-fuel mixture in the spaces between the end face of a piston and an imperforate part of a cylindrical face on a first rotor, the gases generated by ignition of the air-fuel mixture being expanded in two stages, the first stage of expansion being used to develop a torque for sustaining the rotation of the first rotor, and the second stage of expansion being used in a second rotor or turbine to develop a useful torque output for driving an automobile wheel or other part or machine. The remainder of the description relates to the more detailed design of various parts of the engine that is necessary for them to satisfactorily perform their functions.

The design of the first rotor 9 will first of all be considered. In ordinary known forms of a self-contained gas turbine power plant, it is necessary generally to so arrange the relative ratios of fuel to air mass flow supplied to the engine that the rate of air flow is substantially in excess of that which is necessary for full combustion of the fuel, and in this way the temperature of the gases entering the turbine are limited to some value (such as the 1700° F. given for the Chrysler engine) which can be accepted by the material to be used for turbine blading. In the present engine, since the compression of the air-fuel mixture takes place in a space defined by the end of a piston, an imperforate part of the cylindrical surface of the rotor 9 and the inner end of the piston bore in a housing, the volume of such space at full compression when the piston end face is in very close proximity to the surface of the rotor 9 may be extremely small, since the recesses associated with the inlet and exhaust valves and the spark plug in the normal internal combustion piston, connecting rod engine are absent. If, therefore, the engine is to be able to take advantage of the high temperatures that will be possible with the high compression ratio, a cooling system for the blades 21 of the rotor 9 will be necessary which will enable such blading to accept gas temperatures well in excess of 2000° F.

Turning now to a description of the cooling system, the fan 1, which provides the initial air flow into the engine, produces such flow into three coaxial channels 2, 3 and 4 of which the channel 2, as already described, is used for the passage of the air and mixed with fuel to form the main combustion process in the power unit. The intermediate channel 3 provides the cooling air for the rotor 9, and, as shown most clearly in FIGURE 12, guides an airstream into the right hand extremities of the tubes 67 which conduct the air through the rotor 9 from one end plate 68 to the opposite end plate 69 thereof. As shown in FIGURE 12, there are four groups of the tubes 67, each group being intermediate a duct 10 and a series of blades 21. The tubes 67 also pass through the plates 70 and 71 which define the sides of the ports 12 and the openings 20 in the rotor 9. The rotor 9 is also in the form of a fluid tight container having therein two fluid tight spaces, one space defined between plates 68 and 70, and another space defined between plates 69 and 71.

As seen most clearly in FIGURE 12, each of the gas guide ducts between the blades 21 comprises two arcuate metal plates 72 and 73 disposed closely adjacent one another so that there is between them a space shaped similarly to the plates themselves. These spaces are in communication with the fluid tight space formed between the plates 68 and 70 by holes 74 and 75 (see FIGURE 14) in the plate 70 and by holes 76 and 77 in the plate 71. Arcuate partition plates 78 and 79, fluid tightly secured to the circumferentially adjacent tubes 67 of two such groups of tubes 67, extend circumferentially as shown most clearly in FIGURE 12.

It will be understood from FIGURE 12 of the drawings that the two fluid tight spaces formed in the rotor 9 to each axial side of the transverse central plane of the rotor are further divided by plates 78 and 79 in further radially inner and outer spaces, communication between which is only possible through the holes 74, 75 and 76, 77, or through the spacing between the external surfaces of tubes 67. Thus, if the spaces are filled with a liquid coolant, such as water, but preferably a liquid metal such as molten sodium, such liquid coolant can circulate in one direction radially through the space between pairs of plates 72 and 73 through holes 74, 75 and 76, 77 and in the other radial direction between the outer surfaces of the tubes 67.

If it is assumed that the interior spaces of the rotor 9 are filled with a suitable liquid coolant, such coolant will become heated to a high temperature due to the gas flowing through the rotor 9 when it passes into the spaces between the plates 72 and 73 forming the two halves of the blades 21. The coolant passing into such spaces will thus become less dense than elsewhere, and since also the centrifugal effect of the rotation of rotor 9 itself will be such as to urge the heavier part of the liquid coolant radially outward, there will be set up in the liquid coolant circulation, radially inwards through the spaces between the blading plates 72 and 73 and out through the holes 75 and 77 radially outwards between the spacing between the external surfaces of tubes 67 and back again through the holes 74 and 76 into the spaces between the blading 21. During such outward radial movement of the coolant, heat will be passed therefrom to the cooling air impelled by fan 1 axially through the tubes 67. Thus, provided a suitable liquid coolant is used and its flow is such as to transfer heat from the blading 21 at an adequate rate to the airstream passing through the tubes 67, the blading 21 will be effectively cooled so as to allow very high gas temperatures to be accepted without danger of a serious loss of strength by the blading material which would in any case be of the highest strength at high temperatures consistent also with a high conductivity.

Figure 13:
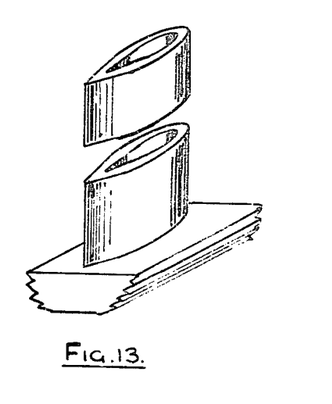
FIGURES 13 and 14 are diagrammatic representations of the turbine blades of known type and as used in the first rotor of the present engine, respectively.
Figure 14:
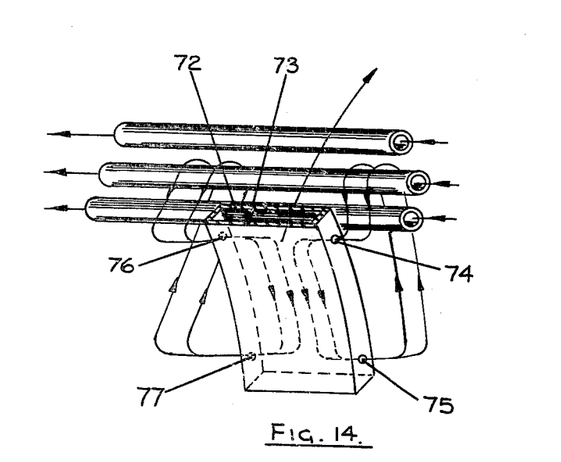

It will be clear by reference to FIGURES 13 and 14, which show, respectively, more common turbine blading used in most gas turbines and the arrangement for axial inward flow in the present engine, the latter arrangement enables the blading to be much more effectively mounted in the rotor by its edges as compared to the former more common arrangement wherein there is a concentration of centrifugal and temperature stress at the blade roof.

The stream of cooling air, after passage through the tubes 67 at their ends terminating in the end plate 69, thence flows through an annular passage 80 formed in the fixed casing member 81 on the downstream side of the engine, as viewed in FIGURE 3. In lieu of an annular passage, there may be a number of closely spaced tubes in similar radial disposition. The passage 80 communicates with the expanding passage 83 in the casing 52 upstream of the last series of blades 49. The air heated in passing through the tubes 67 is, thus, mixed with the main outflowing gas flow from downstream of the pistons 17 at a point in the gas flow whereat the main gas flow has still to pass one or more stages of the axial flow blading 49, 51. Thus, at least some of the heat energy carried away from the rotor 9 by the cooling air stream therethrough will be turned into useful work by expanding it through the last one or more of the output axial flow turbine rings, the arrangement having a beneficial effect on the thermal efficiency of the engine as a whole.

Figure 11:
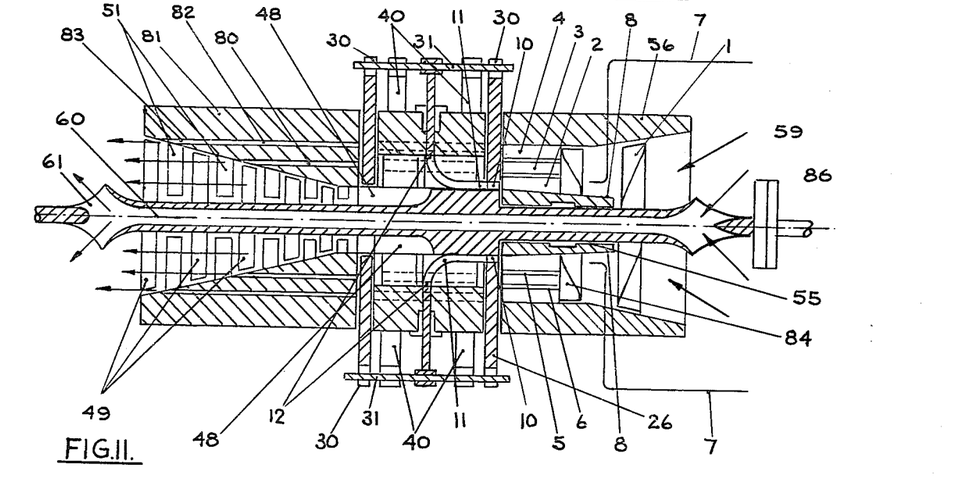
FIGURE 11 is a cross-sectional view of the central part of the engine on a horizontal plane along the main axis $x$—$x$ of the engine.

This concludes the description of the cooling system for the rotor 9, except that it may be explained at this point how, if the engine is idling with the rotor 9 rotating but the output rotor 50 and the main fan 1 stationary, and adequate supply of cooling air can be obtained to prevent the engine overheating in such low power condition. By reference to FIGURES 3, 7 and 11, it will be seen that the coaxial partition walls 5 and 6 are secured in the form of a unitary structure to the outside surface of the cam plate 26, and, therefore, the partition members will be rotated with the cam plate 26 whenever the rotor 9 is being rotated. The partition plate or walls 5 and 6 thus rotate within the annular space between inner and outer parts 55 and 56, respectively, of the fixed housing at the upstream end of the engine. There is secured to the upstream or axially outer ends of the walls 5 and 6, as seen in FIGURES 3 and 11, a second air propeller 84 which will act when rotated in the normal direction of rotation of rotor 50 to impel a stream of air towards the rotor 9. The airstream which is produced by the propeller 84 will, however, be less powerful than that produced by the main propeller or fan 1, but it will, nevertheless, be sufficient to supply an adequate air feed to the mixture air channel 2 and the cooling air channel 3 to the rotor 9 when such rotor is turning only for an idling condition of the engine with the rotor 50 stopped.

The direction of rotation of the air impeller formed by the fan 84 will be opposite to that for the main fan 1. Thus, when the engine is producing useful mechanical power from rotation of the rotor 9, the airstream will first be produced by the fan 1 rotating at a high speed, and then by the fan 84 rotating at a lower speed. The opposed rotation of the two fans 1 and 84 may, by a suitable design, be used to reduce any cyclonal effect produced by the fan 1 on its slipstream, so that the airstream will enter the rotor 9 and the cooling tubes therethrough almost in a direction parallel to its axis or that of the engine as a whole.

The purpose of the third channel 4 will now be explained. This channel is used as a guide duct for a further stream of cooling air impelled by one or both of the fans 1 and 84 through ports in the cam plate 26 and thence through a number of tubes 87 which are disposed parallel to the main axis of the engine x—x between the piston bores extending radially in the block 13. The flow through such channels is used to cool that part of the cylinder block 13 near its inner axial part close to and around the inner radial ends of the bores 14 which parts, because of their proximity to the compression and burning of the air-fuel mixture, might otherwise become very hot. Although the air cooling tubes are shown as a single row arranged between adjacent piston bores 14, there might instead be more than one ring of such tubes of smaller bore but disposed at different radii with respect to the main engine axis x—x.

The cooling air that has passed through the tubes 87 to cool the cylinder block 13 is then, in a manner similar to the airstream that has cooled the main first rotor 9, by way of annular passage 82 returned to the expanding passage 83 just downstream of the discharge of the passage 82 but upstream of the last stage of the impeller blades 49, so that some at least of the heat removed from the cylinder block will be effective, by the expansion of the heated cooling air, to produce a useful torque on the rotor 50. The cooling air from the cylinder block tubes 87 has been shown in FIGURES 3 and 11 as passing into the main gas stream at a point downstream of the point of entry of the cooling air that has passed through the tubes 67 of the first rotor 9, but it may be found convenient to unite the two streams of cooling air before passing them into the main gas stream at some location upstream of the final stage of turbine blades 49.

Figures 15, 15A, 15B:
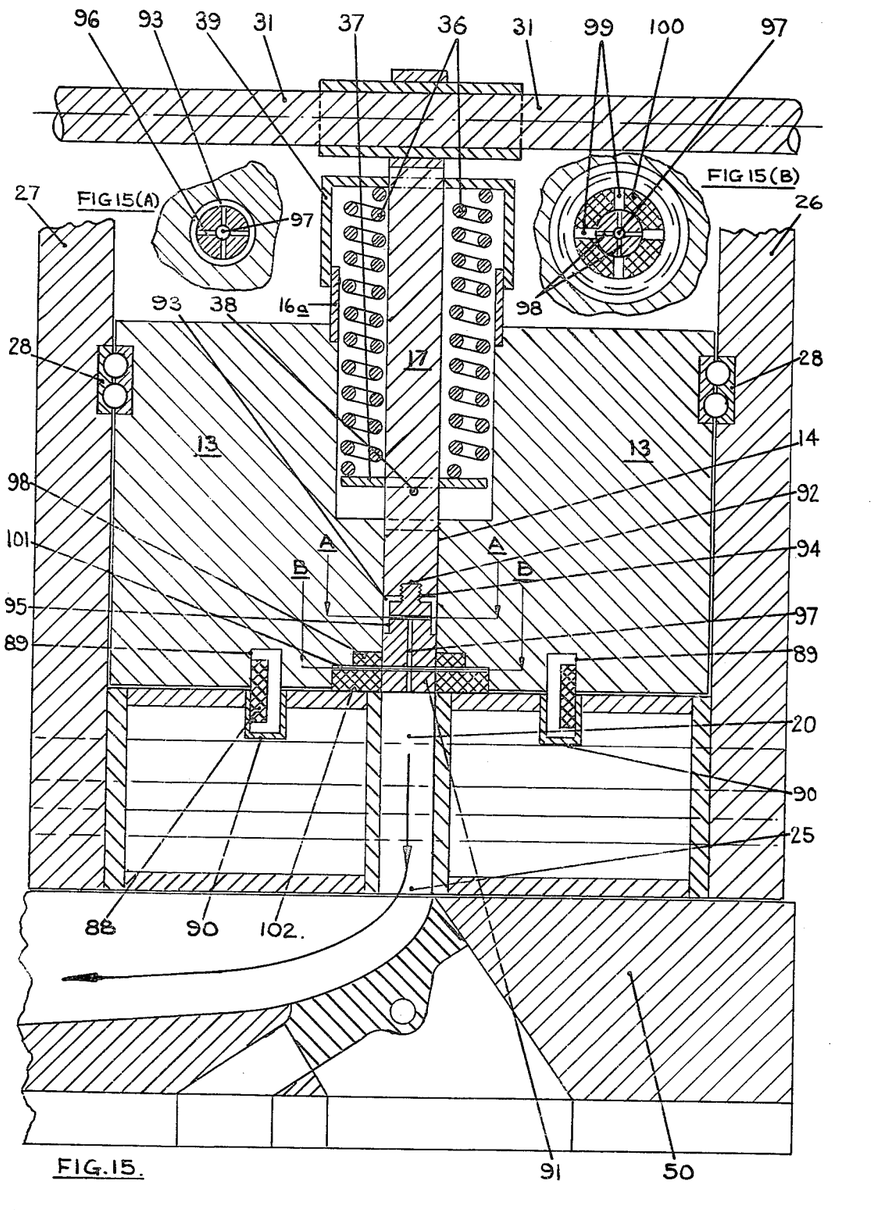

Referring now particularly to FIGURES 15, 15A and 15B, there will now be described the arrangements for sealing the compressed air-fuel mixture and the products of combustion thereof from the spaces below the inner radial ends of the pistons. The escape of gases from the annular space between the radial clearance of the inner bore of the cylinder block 13 and the outer cylindrical surface of the rotor 9, which has been shown much exaggerated in FIGURE 4 and would preferably be only a few thousandths of an inch as necessary to provide running clearance after allowing for temperature expansion of the rotor 9, is carried out by making the gas pressure operative against the inwardly directed faces of sealing discs 88. The discs 88, which are of a suitable material having low friction producing surfaces but with capability of operation at high temperature, are disposed in annular spaces formed by similar mating annular slots 89 and 90 in the cylinder block 13 and rotor 9, respectively. The members 88 are thus urged axially in a downstream direction to form a gas sealing engagement with the outer inwardly facing radial faces of the slots 89 and 90 by the gas pressure acting against the inner radial faces of the discs 88 as a result of gas leakage through the clearance between the adjacent cylindrical surfaces on the cylinder block 13 and the rotor 9.

Where an engine according to the invention has more than one row of pistons 17, it would only be necessary to provide gas sealing means, as described above, axially outwardly of the outer rings of pistons, since it would not matter if gas should pass to a limited extent from one ring of piston bores to an adjacent one, but it is necessary to provide means as described above to prevent it escaping into the clearance between the radial sides of the cylinder block 13 and the cam plates 26 and 27.

Considering now the provision of sealing means to prevent the escape of gases radially outwards along the clearance between the surfaces of the pistons 17 and the bores 14 in the cylinder block 13 in which they slide, referring particularly to FIGURE 15A, it will be seen that an end cap member, generally designated 91, is secured to the inner radial end of each piston 17 by screwing it to a tight fit in the screwed hole 92 at the end of the piston 17. This action also locks in position a sealing cup member 93, so that its end flange 94 is securely locked in position between the end of cap member 91 and the extremity of the piston 17. The sealing cap member 91 has a cylindrical part 95 which extends a small distance axially towards the end of the cap member and fits in a shallow recess therein. There are provided in the body of the cap member 91 level with the central part of the cup member 93 a number of coplanar radially extending passages 96 which meet together at the center and are connected by an axially extending passage 97 with the lower end face of the cap member 91 against which face the gas compression will take effect.

It will be clear that as the piston 17 moves downwardly on a compression stroke the gas pressure will at all times be transmitted by passages 97 and 96 to act upon the inside surface of the axially extending part of the cup member 93, so as to force such parts of the member radially outwards to form a sealing engagement with the bore 14 in the cylinder block; thus, gases will be prevented from escaping axially along the clearance space between the cylindrical surfaces on the pistons 17 and the bores 14. It will also be clear that if such sealing is made effective at the inner ends of the pistons 17, a reasonably large clearance, although only a few thousandths of an inch, may be allowed between such surfaces which will minimize the possible rubbing friction between the surfaces. It will also be clear that since the sealing pressure of the cup member will vary with the compression pressure of the gases, the sealing pressure will be relatively light for a piston near to the top of its suction stroke, but will increase progressively as the piston moves radially inwards on the compression stroke and become maximum when the piston is at the bottom of its compression stroke and the sealing becomes more necessary.

There also extends radially from the axially extending passage 97, at a disposition spaced away from the passages 96, a number of similar radially extending passages 98. When the piston has almost reached the bottom of its compression stroke, these passages 98 are positioned level with a number of holes 99 in the neck part of a packing or gland member 100 of a suitable friction material which is positioned in a recess in the block 13 coaxial with the piston bore 14 at the inner radial end thereof. Thus, the gas compression pressure is communicated through passages 97 and 98 and holes 99 to a space 101 above the larger collar part 102 of the packing member, and such pressure then acts to force the member 100 as a whole hard against the relatively moving cylindrical surface of the adjacent part of the rotor 9. The pressure of the member 100 against the rotor surface thus maintains a sealing contact all around the lower end of the end cap member 91 and prevents or minimizes escape of gases when under compression or burning along the cylindrical surface of the rotor. The pressure with which the member 100 is forced into sealing engagement with the rotor will vary in the same manner as the cup ring member 93 against the bores 14, so that there will only be light contact with low friction when the piston end is well away from the rotor surface on a suction stroke.

Considering the mounting of the output rotor 50 as a whole, it, as best shown in FIGURE 3, is rotatably mounted at its upstream end in a bearing 59 mounted in the fixed inner casing 55. The shaft 50 is extended at its left hand end, as viewed in FIGURE 3, so as to pass through the casing of the main exhaust passage, the shaft being mounted externally of the passage by a ball or roller bearing 85. It should be understood that such bearing 85 has been shown nearer to the exhaust pipe than would be the case in practice in order to keep it within the dimensions of the drawing. Thus, it will be seen that the bearing 59 may be maintained cool by reason of its disposition adjacent the cold air extrant channels to the engine, and the bearing 85 may be located sufficiently far away from the exhaust pipe casing to ensure also its adequate cooling.

Figure 19:
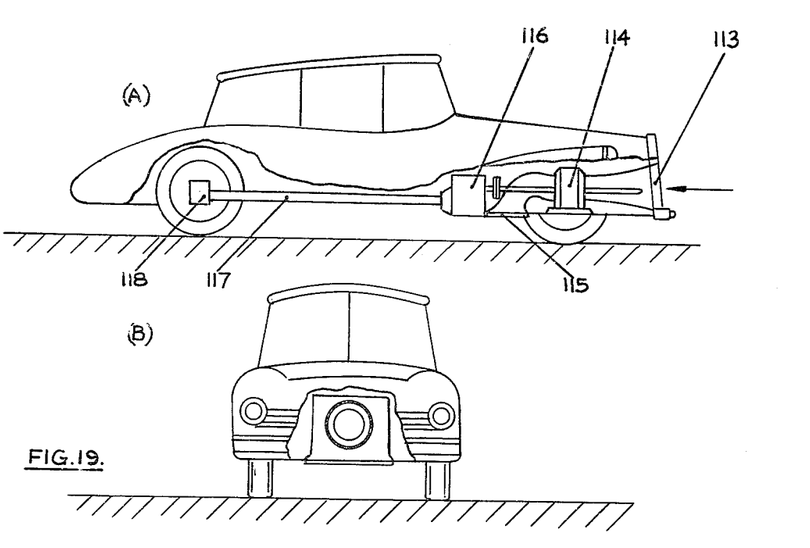

In the drawings, the right end of the shaft 54 of rotor 50 is shown coupled to a shaft 86 (see FIGURE 11) which would be mechanically connected either to the wheels of an automobile for propulsion of same or to perform some other useful work. The mechanical output might, however, be obtained equally well by coupling the left end of the shaft to the device to be driven, and such an arrangement has been used with reference to a later application of the engine in an automobile according to the arrangement shown in FIGURES 19A and B of the drawings.

Figure 18:
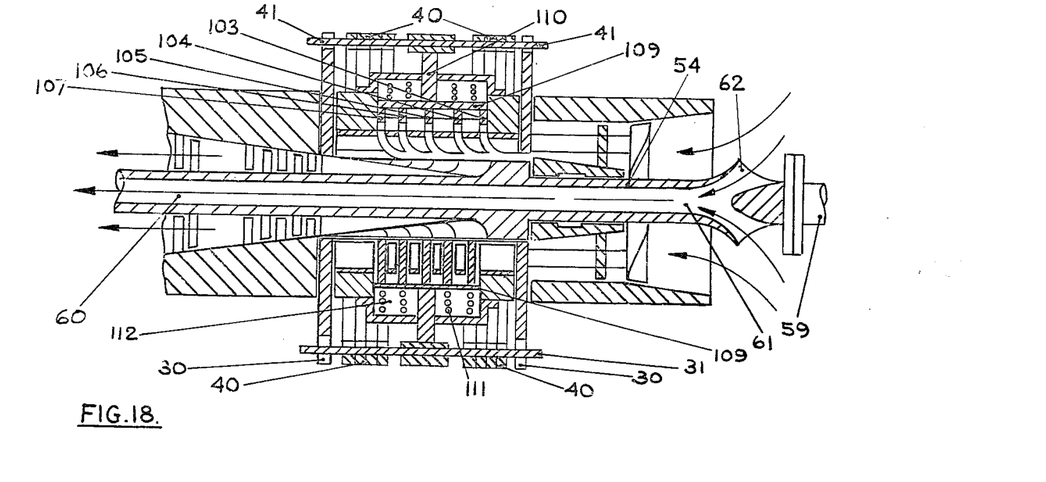
FIGURE 18 is a cross-sectional view on a plane including the axis $x$—$x$ of the engine similar to FIGURES 3 or 11, but with the engine modified to include five rings of circumferentially extending radially disposed pistons as compared to the single ring of pistons shown in FIGURES 3 or 11.

Referring to FIGURE 18 of the drawings, the alternative embodiment of the engine includes five rings of pistons 103 to 107, such pistons being connected at their outer radial ends to cross-head members 109, so that all the pistons may be operated by a single radial thrust rod 110 connecting the transverse shaft 31 and the respective cross-head member 109. In such an arrangement, the radially inward thrust on the pistons may be produced by a simplified arrangement in which pairs of springs 111 and 112 act on the upper surface of each cross-head member 109 to apply an inward radial force to all five of the pistons associative with the particular cross-head member 109.

The engine shown in FIGURE 4 incudes 32 pistons equally spaced relative to the engine axis. With this arrangement, if the outside diameter of the first rotor is approximately 9 ins., the pistons may be of ½″ diameter which is the figure used in the calculations above. If, however, the proportions of the engine are increased by 50% so that the outside diameter of the first rotor is 13½ ins., it becomes possible to use 32 pistons each of one inch diameter, and thus with very little lengthening of the engine, if at all, accommodating the five rings of pistons as shown in FIGURE 18, to provide, at 100% thermal efficiency, an increase of horsepower of some twenty times that considered in the calculations, or in other words an engine 70 horsepower in an engine of maximum width and height of approximately 3 ft.

Other means may also be taken to increase the output for size of the engine, such as by increasing the number of revolutions per minute (over the 1000 assumed for the previous calculations) of the speed of the first rotor, the maximum possible speed of such rotor being limited only by the necessity of providing a sufficient delay period to insure that, during the period in which the first rotor turns from an angular position at which the pistons have reached their most radially outward position on the suction stroke to a second angular position at which the compressed air-fuel mixture begins to escape into the space between the blading 21 of the first rotor, a sufficient time interval has elapsed to enable the mixture to be ignited and to have attained a required burning rate, depending on the ignition delay characteristics for the fuel to be used in the engine. Since the maximum angular movement of the rotor 9 that is available for this fuel burning delay period is approximately 90 degrees in an engine having two gas inlet and discharge channels in the periphery of the rotor 9 as described, the possible speed range for the first rotor, allowing for an automatic advance or retard of the ignition, will most probably be found to be similar to that for an ordinary piston, connecting rod internal combustion engine and be between the speeds of 1000 and 3000 revolutions per minute.

In the calculations leading to the value of 70 H.P. above, the density $e$ of the air-fuel mixture at entry to the spaces below the pistons on the suction stroke has been assumed to be at normal atmospheric of 15 p.s.i. and 15° C. Due, however, to the supercharging effect of the fans 1 and 84, it is likely, even allowing for a temperature increase in the mixture in passing through the inlet channel in the rotor 9, that the mass flow of the mixture into the engine will be substantially in excess of that used in the above calculations in which a density of .0765 lb./cubic foot has been assumed.

FIGURES 19A and B indicated one possible manner in which the engine might be installed in an automobile so that the air inlet 113 to the engine is at the front of the automobile and the engine 114 is disposed as to exhaust downwardly and rearwardly at 115. This engine imparts rotary motion to a torque shaft 117 through an output shaft extending rearwardly of the engine and a speed reduction gear box 116, and the torque shaft 117 drives the rear wheels through the conventional, a differential gear 118.

Figure 20:
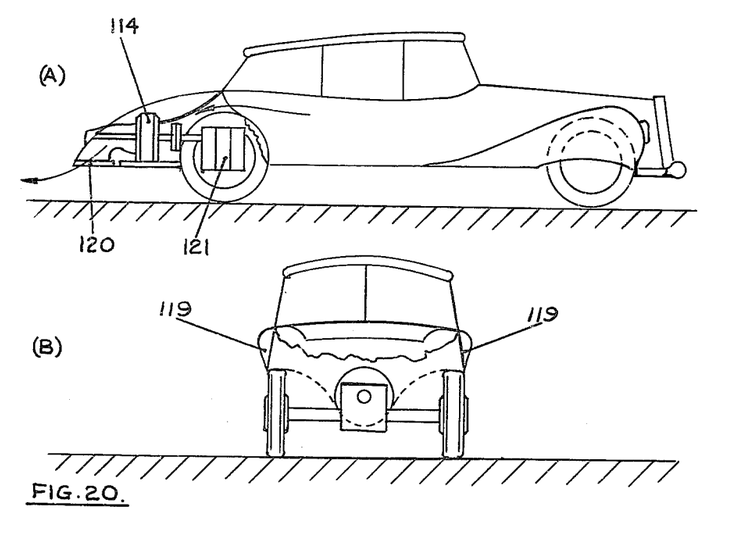

In FIGURES 20A and B, an alternative arrangement is shown with the engine disposed at the rear of the automobile, so as to receive air sucked in through scoops 119 at the sides of the vehicle and discharge its exhaust downwardly and rearwardly at 120. In such arrangement the engine would drive the rear wheels of the automobile through a fixed speed reduction gear box 121, located forwardly thereof. In both such installations the gear box would require a mechanism for reversing the drive to propel the car rearwardly.

Figure 21:
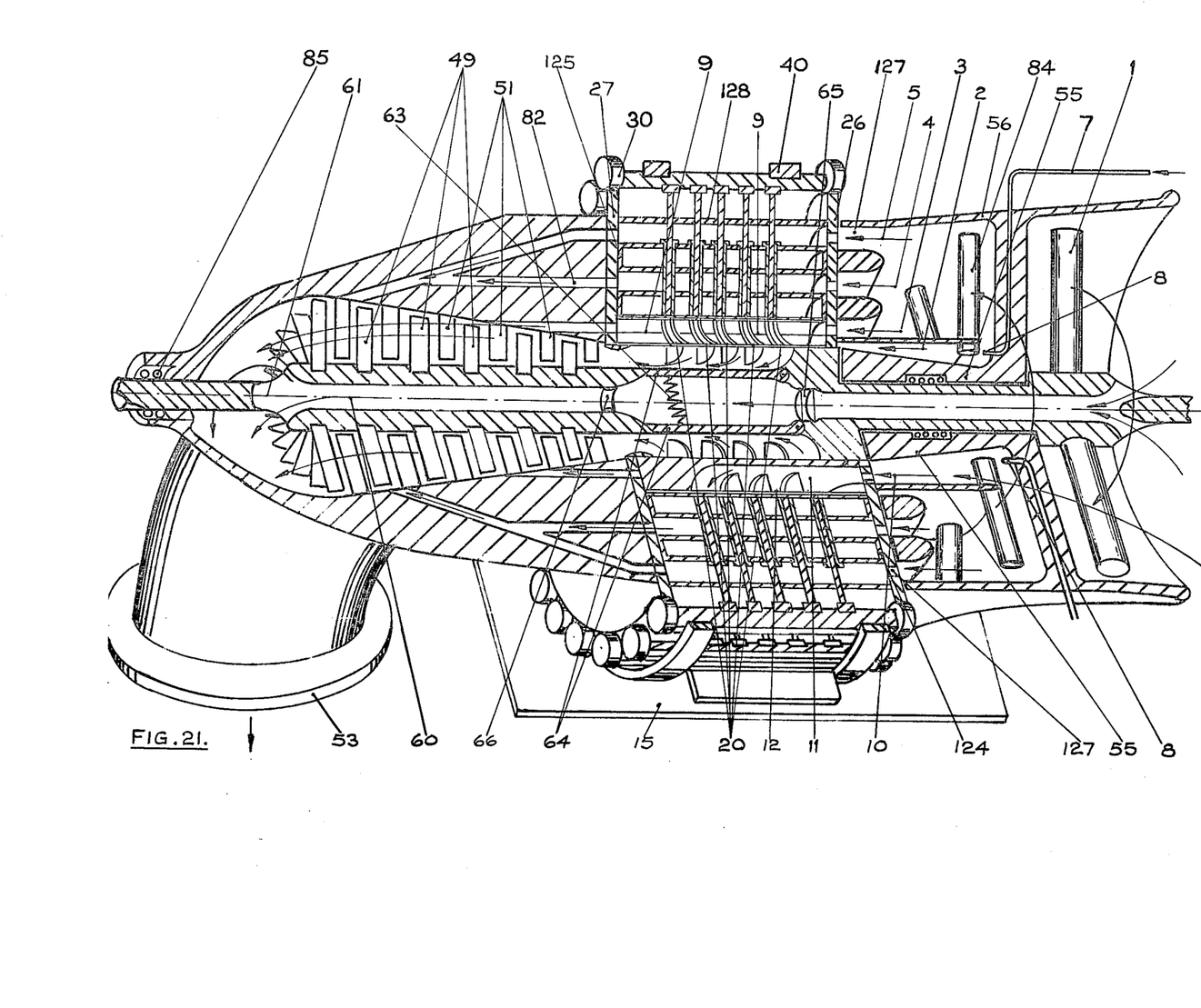
FIGURE 21 is a perspective view, partly cut away, of still another embodiment of the engine having five rows of pistons and a different cooling system.

In the embodiment shown in FIGURE 21, the engine includes five rows of pistons and in this respect is similar to the arrangement of the engine shown in FIGURE 18. The operation of the engine as shown in FIGURE 21 is similar to that already described, the air being drawn in by the fan 1 from the right as shown, fuel being sprayed in from the jets 8, and the mixture passing simultaneously into the spaces or bores of a row of five pistons, such as those shown in the bottom half of the figure. The mixture is trapped within the bores between the inner ends of pistons 17 and the outer imperforate surface of the first rotor 9, compressed by inward movement of a complete row of five pistons, ignited, and the burning compressed mixture, expanded out of the radial guide ducts 20 in the rotor 9 and then passed through the blading of the rotor 60 to produce a torque output from either end thereof.

Figure 22:
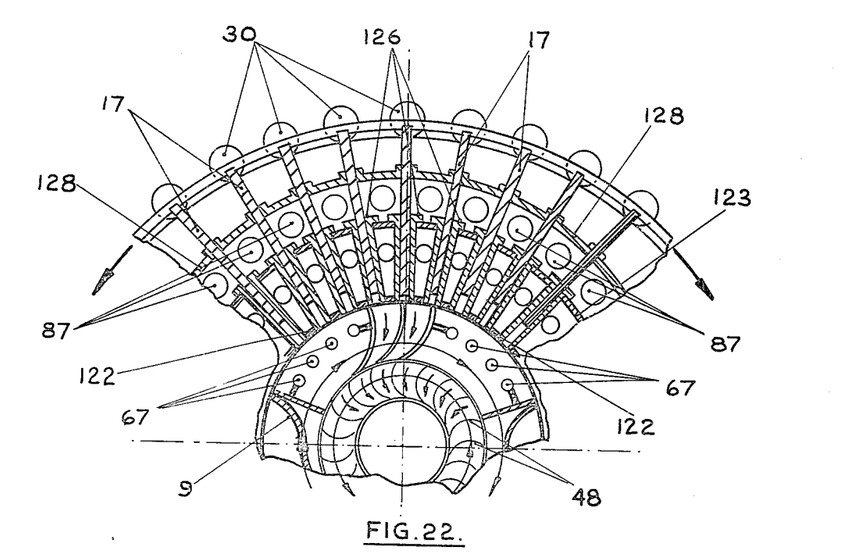
FIGURE 22 is an enlarged cross-sectional view of part of the engine and shown in FIGURE 21 taken on a vertical plane at right angles to the main axis of the engine.

This embodiment of the engine, however, differs in the following respects from the embodiments described above. The cylinder block 13, although still a stator assembly, includes inner and outer cylinders 122 and 123, respectively, the ends of which are sealed by end plates 124 and 125. The pistons 17 move radially in the bores of sleeves 126 (FIGURE 22) which extend from the outer cylindrical surface 123 of cylinder to the inner cylindrical surface of cylinder 122. The entire space within the cylinder block as a whole is filled with a cooling fluid, and the cooling air entering through channel 4 passes through the tubes 87 (see FIGURE 22), removing heat from the cooling liquid in such passage. The heated cooling air passes by way of passage 82 into the main exhaust stream from the engine after having produced a useful torque from the passage of the gases through at least the last rows of fixed and rotatable turbine output bladings 51 and 49 respectively. In the engine, as shown in FIGURES 21 and 22, however, there is provided a third channel 127 for a stream of cooling air in addition to the two channels 3 and 4 to which reference has already been made. This third stream of cooling air is disposed outwardly of the channel 4, and it receives air impelled by the fans 1 and 84, passes through holes in the cam plate 26, then through a space defined between the outer wall 123 of the cylinder block 13 and a cylindrical outer casing 128, through holes in the cam plate 27 to a passage which deflects the stream inwardly toward the main axis of the engine, mixing the stream with the heated cooling air passing through passages 82, so that the commingled streams produce supplemental torque output by their impelling actions against the last rows of output turbine blading. It is apparent that this last outer stream of cooling air forms a jacket around the outside of the central part of the engine and thereby serves to reduce any heat that might be lost from the cylinder block 13 and put it to good use.

The stream of cooling air passing through channel 127 formed between the outer jacket 123 and the casing 128 also has another important function. Since any leakage of gas from the high pressure combustion chambers in the bores below the inner ends of pistons will escape into the passage 127, this leakage of gas will be mixed with the cooling air and still provide useful torque in driving the engine. In consequence, the pistons 17 can all be given a reasonable freedom to slide in the bores of the sleeves 126, since a completely effective gas sealing is not essential. Thus although the engine, as shown in FIGURE 21, has a total of 160 pistons (i.e., five rows of 32), frictional losses are not excessive.

The embodiment of the engine shown in FIGURES 21 and 22 also differ from that previously described in that it is simplified by the omission of the compression springs 36. The entire inward radial force on the pistons of the engine shown in FIGURES 21 and 22 is produced by the two large flexible straps or bands 40 which act upon the rollers 30 and the outer ends of the pistons 17 through the cross members 31. Such bands or straps are shown in FIGURES 21 and 22 as consisting of single members, each encircling the central part of the engine and accommodated in recesses in the outer surface of the cross members 31.

Figure 23:
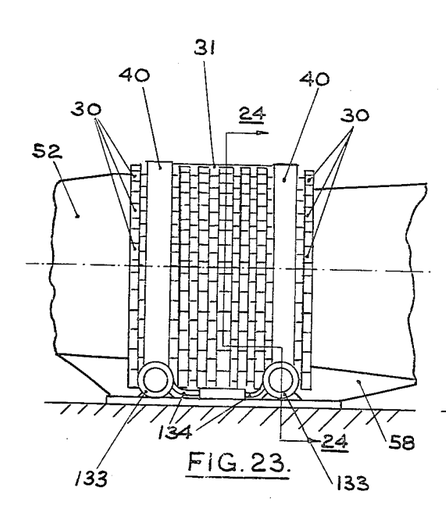
FIGURE 23 is an elevational view in reduced scale of the central part of the engine shown in FIGURES 21 and 22.
Figure 24:
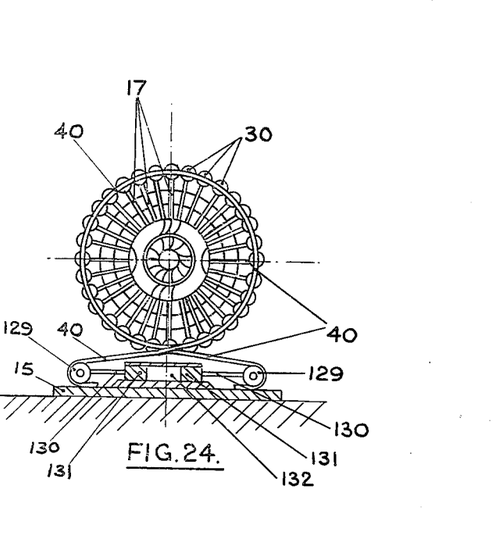
FIGURE 24 is a cross-sectional view taken along the line 24—24 of FIGURE 23.

As has been referred to earlier in the description, the design of the engine is such that, due to the accessibility of the bands 40, it becomes a relatively simple matter to provide means whereby the tension in the bands 40 may be adjusted so that the compression ratio of the engine can be altered within a certain range. One possible solution is shown in FIGURES 23 and 24 wherein opposite ends of the bands are anchored to the baseplate after passing around bosses 129 on the ends of piston rods 130. The piston rods are connected to pistons 131 accommodated for movement within the cylinders 133. This application of hydraulic pressure to the space 132 between the pistons 131 increase the tension and inward radial force on the cross shafts 31 and the inward radial force applied to all the pistons, thereby increasing the compression ratio of the engine.

One advantage of a variable compression ratio in an automotive engine would be realized when it is working at a fraction of its full power and the mass of air flow is low, such as when it is in traffic. Under these conditions, it would be advantageous if the compression ratio could be increased, since the cooling system for the guide or turbine blades of the first rotor 9 would then be able to accept the gases of combustion at higher temperatures than would be possible when the engine was working at a higher fraction of its maximum power output with an increased speed of the rotor 9 and therefore an increased mass flow of combustion gases. The compression ratio could be varied automatically by the hydraulic pressure applied to the cylinders 133 so that the compression ratio can be adjusted over a range to maintain the gas temperature in the rotor low enough to preclude the possibility of damage to blades of the rotor 9 and governed by the speed of rotation of the rotor 9 which is an indication of the mass of flow of the combustion gases therethrough.

The design of the engine as proposed would seem, therefore, to be such as to enable the output power of the engine to be regulated in a manner such that the product of mass flow and compression ratio might be maintained substantially constant, as compared to the characteristics of a conventional gas turbine using a rotary compressor in which the delivery pressure of the compressor varies with the rotor speed squared and, therefore, drops more quickly as the mass flow is reduced. Such characteristic of conventional gas turbines make them unsuited for use in automobiles wherein it is often necessary to operate the engine for long periods at a small fraction of the full power output.

The engine above described and shown in FIGURES 21 to 24 is particularly suited for use as an automobile engine. In other applications of the engine in which a constant or substantially constant speed could be specified, it would not be so necessary to vary the compression ratio, and it could be maintained at the maximum to give the full gas temperature which the rotor 9 could accept safely, depending on the material used for the gas ducting in the rotor 9.

It should also be noted that in the embodiment of the engine shown in FIGURES 21 through 24 the downstream ends of the flow passages 4 and 127 act as a nozzle in which the flow area reduces as the gases flow radially inwards. This makes possible a design which causes the gas flow to "choke" at Mach number greater than unity in order to obtain constancy of compression ratio with variable mass flow.

The engine has thus far been described in embodiments in which the pistons are operated so as to compress the air-fuel mixture by inward radial movement. It is possible, however, that a similar engine may be made in which the pistons have an outward radial compression stroke as shown in FIGURES 25A and B. In this arrangement the main fan 1' impels air-fuel mixture into the first rotor 9' so as to be deflected towards the outer radial ends of pistons 17' wherein it is compressed in a similar manner to that described in the previous embodiment. The mixture and its combustion products then expand radially outwards through the impeller blades 21', are deflected axially by the blades 48' of the output rotor 50' and exhausted through the rows of fixed and rotating axial flow turbine blading 49' and 51'.

Figure 26:
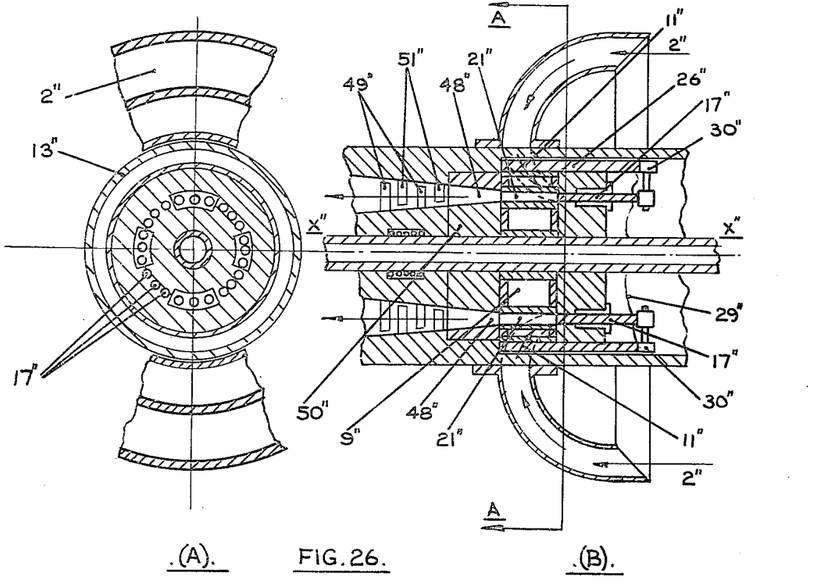

In a still further embodiment as shown in FIGURES 26A and B, the pistons 17" are arranged with their axes parallel to one another and to the axis of the engine as a whole. Thus, the pistons compress the mixture in a movement parallel to the main engine axis after the air-fuel mixture has been admitted at 2" and deflected axially by passages 11" in the first rotor 9". The gases, after compression, expand through the blading 21" of the first rotor 9", pass through blading 48" of the second or output rotor 50", and are then made to flow axially through the fixed and rotary bladings 49" and 51" of the output turbine.

Figure 25:
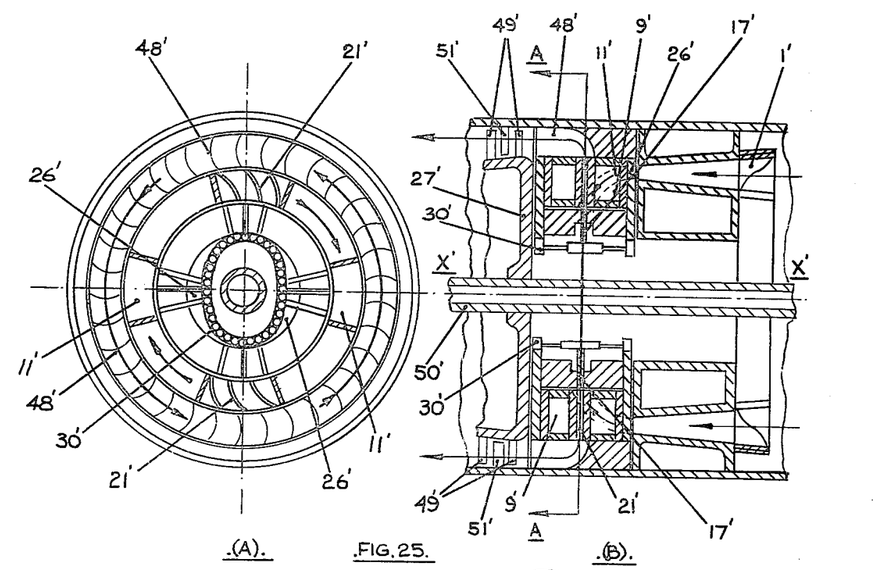

It will be seen that in both the arrangements shown in FIGURES 25 and 26A and B, the embodiments operate in a similar manner to that already described with reference to the earlier figures in that the compression of the air-fuel mixture takes place between the ends of a series of pistons 17' or 17" and the imperforate part of the cylindrical face of a first rotor 9' or 9", such rotors both being turned by the reaction torque resulting from a change in the velocity of gases in passing through the blades 21' or 21" of the first rotor, the gases then being passed through the blades 49' and 51' or 49" and 51" of the output turbine to produce a useful output of mechanical power.

The engine has been particularly described with reference to its use for automobile propulsion, but the invention should not be regarded as limited to such application since it has general application as a novel form of prime mover. Such application might include propeller driven aircraft and helicopters, marine craft generally but including also such specified forms of marine craft such as hydrofoil and craft known under the registered British trademark as "Hover Craft," and as a power unit for rail traction, use being made as necessary of electro or hydraulic transmission systems. Finally, it might have application as a stationary power unit in industry wherever there was need of a compact engine having the low speed torque characteristics of a turbine combined with the high compression and thermal efficiency associated with the piston form of compressor.

Although the engine, according to the invention, has been described with a method of feeding the fuel by means of a fuel spray in the relatively uncompressed air impelled by the fans 1 and 84 passing through the main air intake to the engine, it should be understood that it might, if the compression ratio used in the engine is such as to produce compression-ignition or spontaneous diesel type ignition of the fuel, be found more advantageous to inject the fuel through a delivery valve either mounted in the pistons 17, and supplied through axial passages therein from flexible conduits connected to their radially outer ends, or through delivery valves mounted in an appropriate part of the cylinder block 13 adjacent the lower or radially innermost ends of the cylinder bores 14. Under such circumstances, the pistons, at the beginning of their compression strokes would be effective to compress air only, the fuel being injected only after the pressure of the compressed air had been raised above some predetermined minimum value necessary to cause compression-ignition of the particular fuel being used, or in other words, in a manner similar to that which takes place in known forms of diesel or compression-ignition engines. An engine so operating according to the invention might be referred to as a form of "diesel turbine power unit."

The invention is thus subject to all variations coming within the construction of the following claims.

I claim:

1. An engine comprising an output impeller and cooperating rotor and stator assemblies, one of said assemblies including a piston and piston chamber in which a combustible fuel is compressed by the piston and ignited and the other including a closure for the piston chamber to permit compression of the combustible fuel by the piston and an exhaust passage which periodically comes into communication with the piston chamber, receiving the exhaust gases of combustion from said chamber and directing them as an impelling fluid against the output impeller.

2. An engine as set forth in claim 1 in which the one assembly contains a plurality of pistons arranged in closed array and the relative movement between the assemblies makes it possible for the exhaust passage of the other assembly to receive the exhaust gases of combustion from the piston chambers in sequence.

3. An engine as set forth in claim 1 including means defining a by-pass for the upstream end of said output impeller, gate means in communication with the said exhaust passage controlling the flow through said by-pass and movable by centrifugal force produced by the rotation of said output impeller to close the said by-pass.

4. An engine as set forth in claim 1 in which the stator assembly carries the piston and the rotor assembly carries the exhaust passage, and including a series of impeller blades carried by the rotor assembly to impart the rotary motion to the rotor assembly.

5. An engine as set forth in claim 1 including a passage in the assembly containing the exhaust passage for introducing an air-fuel mixture to the piston chamber.

6. An engine for the conversion of energy in a fuel into mechanical power comprising a cylinder block containing a piston bore, a movable piston within said bore, means for introducing an air-fuel mixture into said piston bore to be ignited therein, a rotor having an outer surface which closes said piston bore during the compression stroke of said piston and having also an exhaust passage through which the exhaust gases of combustion are discharged under pressure from said piston bore, the bore-closing surface and the exhaust passage being spaced apart on the rotor so that the piston bore is successively opened and closed, and impeller blades carried by said rotor through which the exhaust passage directs the gases of combustion, whereby said gases of combustion serve as an impelling fluid to drive the rotor.

7. An engine as set forth in claim 6 in which the cylinder block includes a plurality of piston bores arranged in closed array, each containing a reciprocating piston therein, the exhaust passage of the rotor moving into communication with successive piston bores to receive the exhaust gases of combustion of the piston bores in sequence.

8. An engine as set forth in claim 6 including cam means moving in timed relation to the rotor and operatively connected to the piston to actuate the piston.

9. An engine as set forth in claim 6 including cam means carried by the rotor and operatively connected with the piston for displacing the piston in the respective bore in one direction and spring means for displacing the piston in the opposite direction.

10. An engine as set forth in claim 6 including an output impeller to which the combustion gases are directed downstream of the impeller blades carried by the rotor, and by-pass means which, when in communication with the exhaust passage in the rotor, directs at least part of the impelling fluid past at least the upstream end of said output impeller.

11. An engine comprising coaxial stator and rotor assemblies, one of said assemblies including a closed array of piston bores and reciprocating pistons within said piston bores, and the other of said assemblies including closure means which comes into communication with successive piston bores to permit compression of a combustible fuel within the piston bores by the relative movement of the pistons and piston bores, exhaust passage means which comes into communication with successive piston bores and receives the gases of combustion from said piston bores in sequence, surfaces carried by the rotor assembly against which the exhaust gases act to impart rotation to the rotor assembly, means for introducing a combustible fuel into the piston bores in which the fuel is compressed and ignited, and means for imparting relative movement to the pistons and piston bores.

12. An engine as set forth in claim 11 including impeller blades carried by the assembly having the exhaust passages, whereby the exhaust passage establishes communication between the piston bores and the impeller blades to impart rotation to the rotor assembly.

13. An engine comprising an output impeller and cooperating rotor and stator assemblies, the stator assembly including a plurality of relatively movable pistons and piston bores, a combustible fuel being compressed prior to ignition successively in the piston bores, and the rotor assembly including means defining a passage for admitting the combustible fuel to the piston bores in sequence during its rotation, a surface to close the piston bores in sequence during combustion and passage means to exhaust the combustion gases from said piston bores in sequence and establish communication between the piston bores and the output impeller, whereby the combustion gases serve as the impelling fluid for the impeller.

14. An engine as set forth in claim 13 including means defining a cooling passage through the stator, means for introducing a cooling fluid into said cooling passage, and means for directing said cooling fluid after it has been heated in passing through the stator toward said output impeller so that it serves as a supplemental impelling fluid.

15. An engine for converting the energy in a combustible gas into mechanical power compirsing an output impeller, a block containing a piston bore, a reciprocating piston within said piston bore, a rotor movable relatively to the block and carrying a surface which closes the piston bore during the combustion stroke of the piston, means in advance of said surface establishing communication between the source of combustible gas and the piston bore, whereby the combustible gas is introduced into the piston bore, and means behind said surface establishing communication between the piston bore and the output impeller, whereby the combustion gases serve as an impelling fluid to drive the output impeller.

References Cited by the Examiner

UNITED STATES PATENTS

| | | | |
|---|---|---|---|
| 1,047,232 | 12/12 | Ivery | 60—39.34 |
| 1,277,626 | 9/18 | Milke | 60—39.38 |
| 2,386,497 | 10/45 | Orloff | 60—39.4 |
| 2,624,173 | 1/53 | Bloomberg | 60—39.66 |
| 2,755,621 | 7/56 | Terrell | 60—39.25 |
| 2,933,886 | 4/60 | Sharma | 60—39.66 |
| 3,068,647 | 12/62 | Santamaria et al. | 60—39.25 |
| 3,093,968 | 6/63 | Osofsky | 60—39.17 |

SAMUEL LEVINE, *Primary Examiner.*